United States Patent [19]
Peter

[11] 3,856,632
[45] Dec. 24, 1974

[54] METHOD AND APPARATUS FOR PRODUCING A DISTILLATE

[75] Inventor: Klaus-Dieter Peter, Varrel, Germany

[73] Assignee: Fried. Krupp Gesellschaft mit beschrankter Haftung, Essen, Germany

[22] Filed: July 17, 1973

[21] Appl. No.: 379,978

[30] Foreign Application Priority Data
July 26, 1972 Germany.............................. 2236519

[52] U.S. Cl.................... 203/11, 203/71, 203/88, 203/24, 203/26, 202/173
[51] Int. Cl............................................. B01d 3/06
[58] Field of Search ............ 203/10, 11, 88, 91, 71, 203/24, 26; 202/173, 174, 235

[56] References Cited
UNITED STATES PATENTS

| | | | |
|---|---|---|---|
| 2,893,926 | 7/1959 | Worthen et al..................... | 202/173 |
| 3,165,435 | 1/1965 | Henszey............................. | 203/26 |
| 3,433,717 | 3/1969 | Loebel............................... | 203/26 X |
| 3,766,020 | 10/1973 | Sieder................................ | 203/26 |

Primary Examiner—Wilbur L. Bascomb, Jr.
Assistant Examiner—David Edwards
Attorney, Agent, or Firm—Spencer & Kaye

[57] ABSTRACT

A method and apparatus for distilling raw water, especially sea water or brackish water employing a combination of a multi-stage flash evaporator and a vertical tube evaporator. The water is preheated by passing it through condensers of the flash evaporator and is subsequently conducted through the flash evaporator stages to be partially evaporated and to have its resulting vapor condensed in the flash evaporator condensers. The raw water which has been preheated while passing through the condensers is delivered to a vertical tube evaporator where it is heated by steam. The vapor produced in the vertical tube evaporator is compressed by a hot water ejector and together with the excess vapor from the hot water ejector is used as heating steam. Part of the condensed heating steam is fed to the first distillate trough of the flash evaporator, the remaining part being returned to the water jet ejector motive stream.

The unevaporated raw water from the vertical tube evaporator is delivered to the multi-stage flash evaporator to be partially evaporated.

10 Claims, 3 Drawing Figures

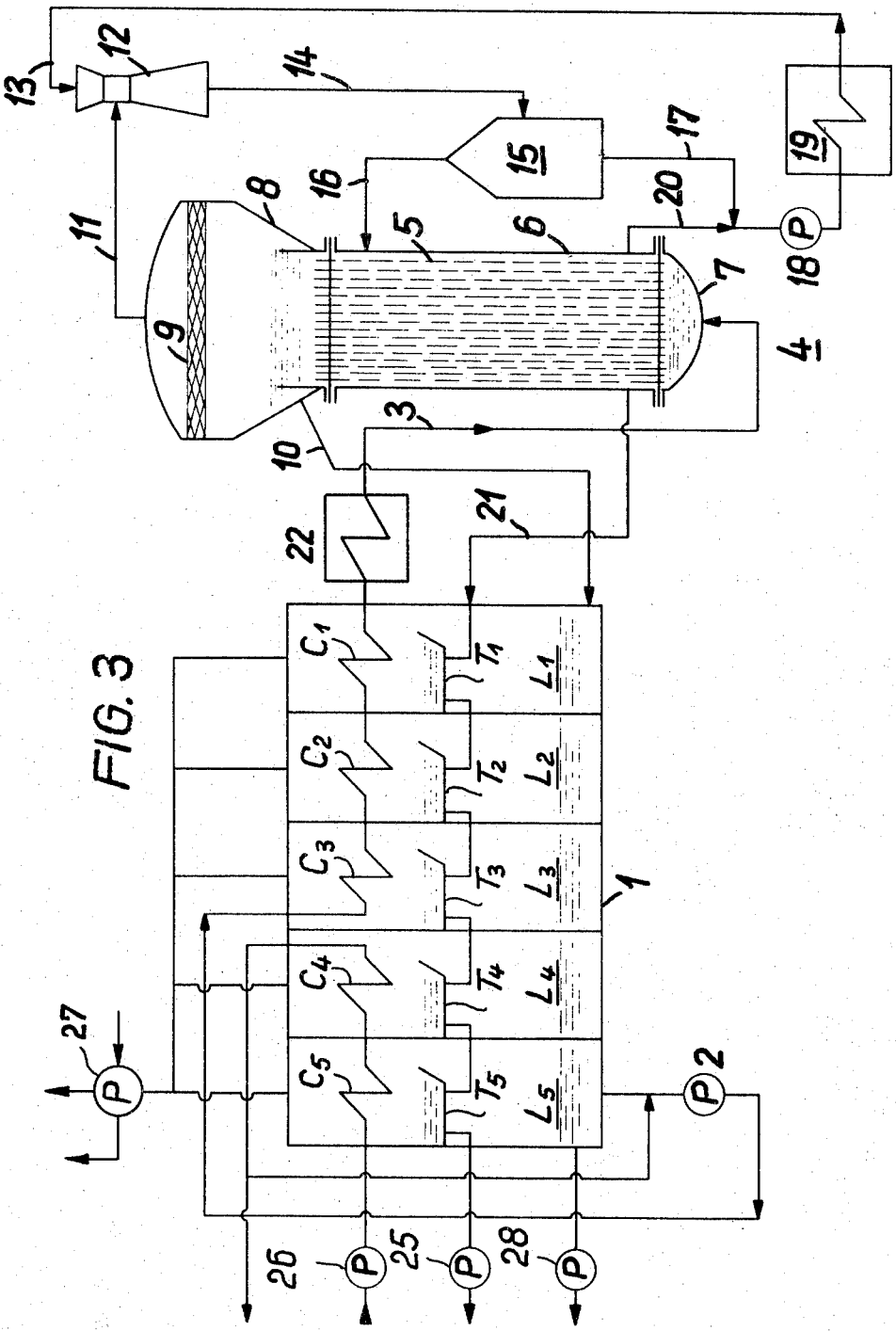

METHOD AND APPARATUS FOR PRODUCING A DISTILLATE

BACKGROUND OF THE INVENTION

The present invention relates to a method and an apparatus for producing a distillate from raw water, such as sea water or brackish water, in a multi-stage flash evaporator in which the raw water is heated in the condensers and is conducted through a plurality of flash stages where it partially evaporates, the produced vapor is condensed in condensers associated with each flash stage, and means are provided for extracting and removing the inert gases from the produced vapor as is an apparatus for the input of additional heat energy.

In the treatment of water, it is known that the multi-stage flash evaporation process can be used to remove the salt from sea water or brackish water. Systems operating according to this principle have found to be efficient in practice. The energy requirement of such systems is generally between 120 and 50 kcal/kg distillate without considering the energy required to drive the pumps. This latter relatively low specific heat requirement requires a system with a large number of stages. A further reduction in the required specific heat can be achieved only by a substantial increase in capital expenditures and appears advisable only when the costs for the required heat energgy are very high.

Also, in the treatment of salt water, the vapor compression process has been used, but only for smaller systems. The energy requirement of an evaporator system operating according to this principle is substantially lower than that of a flash evaporator system. Generally, the vapor compression systems are designed to have a specific heat consumption of about 15 kcal/kg distillate. The specific heat requirement of such an evaporation system decreases with increasing operating temperature. However, an increase in the operating temperature requires that the fed-in raw water be preheated to a higher temperature range and this, in turn, requires a larger heat exchanger. These heat exchangers which serve to cool the produced distillate as well as the concentrated raw water are usually provided as conventional pipe of plate heat exchangers.

In the vapor compression process, vertical tube evaporators and forced circulation evaporators are also used wherein the raw water is evaporated at a heating surface, e.g., heated tube bundles.

SUMMARY OF THE INVENTION

It is an object of the present invention to reduce the distillate production costs of raw water, such as sea water, and to increase the operational dependability of the flash evaporation system used in such production.

The present invention provides an improved method and apparatus for effectively distilling raw water (e.g., sea water or brackish water) at a low cost in a multi-stage flash evaporation system. The invention provides improvements in a method of distilling raw water in a multi-stage flash evaporator, which method includes preheating the raw water in condensers of the flash evaporator, partially evaporating the heated water in a plurality of evaporators connected to the flash evaporator, condensing the evaporated water in condensers connected to each evaporator stage, collecting the condensed vapor from each evaporator stage, removing inert gases from the evaporator stages by means of a vacuum pump, e.g., a water or steam ejector, and adding additional heat energy to the raw water by means of a tube-shell heat exchanger. The improved method of distilling raw water provided by the present invention involves initially conducting the raw water from the condensers of the flash evaporator into at least one vertical tube evaporator to partially evaporate it by the addition of heat provided by a heating medium, which is the produced vapor of the vertical tube evaporator that has been removed, compressed to a higher temperature, and returned to the vertical tube evaporator by a heat pump means, to transfer its latent haet to the raw water. The condensed vapor is then passed as a distillate from the vertical tube evaporator to the flash evaporator to transfer part of its liquid heat by stepwise evaporation to the raw water being heated in the condensers of the flash evaporator. After one passage through the tubes of the vertical tube evaporator, the raw water which has been slightly more concentrated is extracted from the upper chamber and fed to the first stage of the flash evaporator and then to the subsequent stages thereof where the raw water is evaporated stepwise. The latent heat of the partially evaporated raw water is then transferred by condensation of the vapor produced in the individual stages to the raw water being heated in the condensers of the flash evaporator. The distillate is collected in the trough of the respective stages of the flash evaporator and mixed with distillate from the vertical tube evaporator and removed from the last stage of the flash evaporator.

According to the present invention is is preferred that the heat pump means for compressing the produced vapor of the vertical tube evaporator consist of a hot water ejector and an ejector motive water pump. Also, it is preferred to provide a heat exchanger for the entire heat source for the heat pump means wherein the heat exchanger is positioned between the outlet of the ejector motive water pump and the hot water ejector. Moreover, it has been found in special cases that a heat exchanger should be connected in a pipeline between the discharge point of the raw water in the flash evaporator and the entry point of the raw water into the verticle tube evaporator.

BRIEF DESCRIPTION OF THE DRAWINGS

FIG. 3 is a schematic illustration of a third embodiment of the present multi-stage flash evaporation system which shows the heat transfer area of the vapor compression system divided into two apparatuses.

DESCRIPTION OF THE PREFERRED EMBODIMENTS

Figure 1:
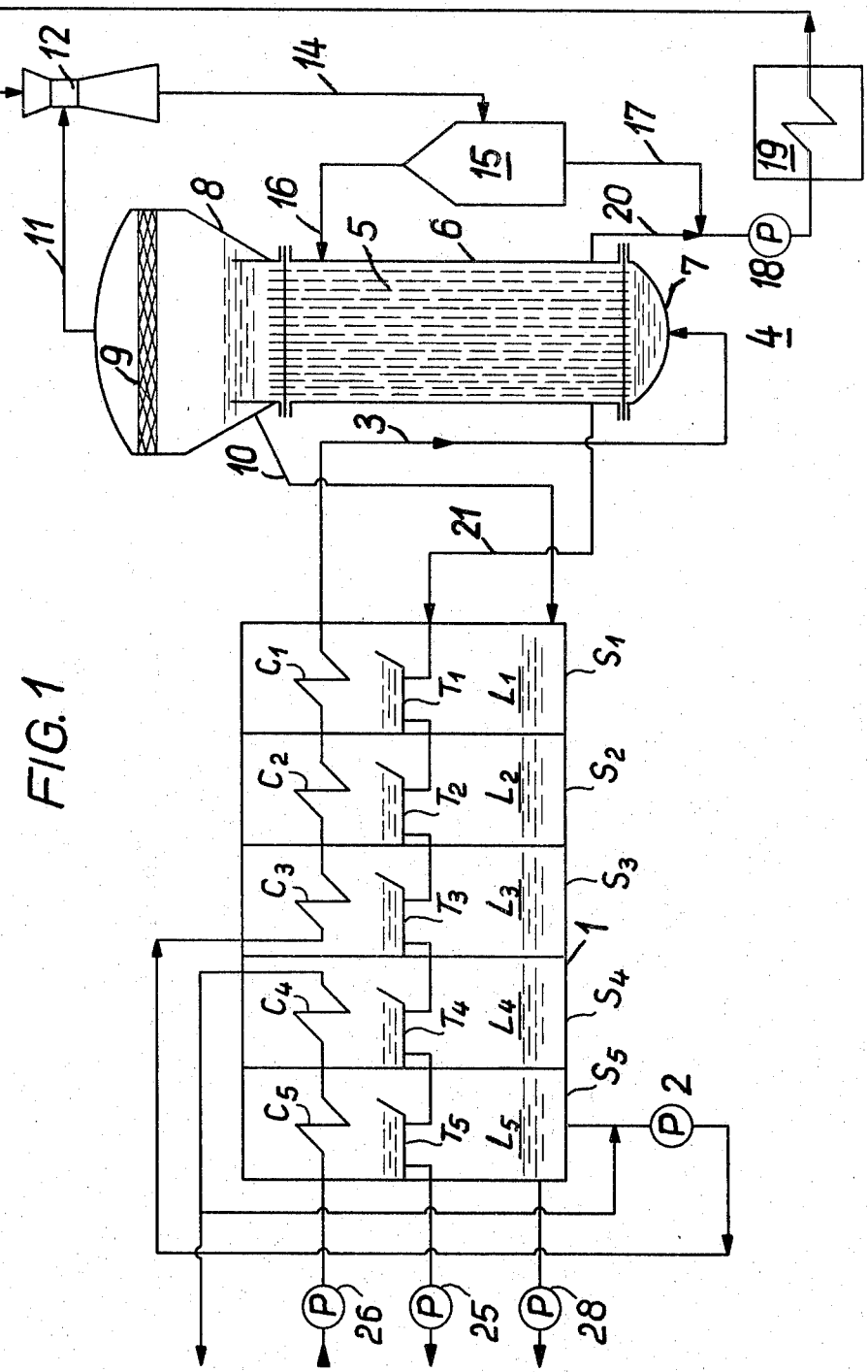
FIG. 1 is a schematic illustration of an embodiment of the multi-stage flash evaporation system of the present invention which operates according to the brine recirculation principle.

The present method and apparatus as illustrated in the drawings and described below relate to the distillation of raw water, e.g., sea water or brackish water, in a multi-stage flash evaporation system.

Referring to FIG. 1, there is shown an embodiment of a multi-stage flash evaporator 1, according to the present invention. As shown the flash evaporator 1 is provided with five flash chambers $S_1$, $S_2$, $S_3$, $S_4$ and $S_5$, which form the stages of the evaporator.

Each of the stages, $S_1$, $S_2$, etc., includes in its upper chamber a condenser, $C_1$, $C_2$, $C_3$, $C_4$ or $C_5$. The stages, respectively have a series of connected distillate troughs $T_1$, $T_2$, $T_3$, $T_4$ and $T_5$; and a series of lower chambers $L_1$, $L_2$, $L_3$, $L_4$ and $L_5$ where the brine of each stage is collected from the process.

The flash evaporator system in this embodiment is connected according to the brine recirculation principle. A brine recirculation pump 2 sucks the liquor from the last stage $S_5$ of the flash evaporator 1 and conducts it through condensers $C_3$, $C_2$ and $C_1$ disposed in the upper chamber of the individual flash stages $S_3$, $S_2$ and $S_1$ of the flash evaporator 1. Here, in passing through the condensers $C_3$, etc., the liquor from the last stage $S_5$ is heated step by step by condensed vapors and then enters through a pipeline 3 into a vapor compression evaporator 4 which is a vertical tube evaporator. The vertical tube evaporator 4 includes a bundle of vertical pipes 5, a steam chamber 6 enclosing the bundle of pipes 5, a lower water entry chamber 7, and a vapor chamber 8 with a moisture separator 9 disposed therein. The raw water flows through the vertically disposed nested pipes 5 and is first heated to its boiling temperature by the steam disposed in the steam chamber 6. With this further addition of heat, a portion of the untreated water evaporates so that at the point of exit from the nested pipes 5, a mixture of water and steam enters into the vapor chamber 8 of the vertical tube evaporator 4. With a suitable arrangement of deflector plates in the vapor chamber 8, this mixture of water and steam is separated. The raw water whose impurity content has been slightly increased by the partial evaporation in the vertical tube evaporator 4, flows through a pipeline 10 to the first flash chamber $S_1$ of the flash evaporator 1. The vapor produced in the vertical tube evaporator 4 first passes through the moisture separator 9 where moisture droplets which have possibly been carried along are held back, and then flows through a suction line 11 to a hot water ejector 12.

As the vapor is being sucked into the ejector 12, heated water which is emitted from the evaporator 4 through line 20 is delivered by a pump 18 through a heat exchanger 19 and a pipeline 13 into the hot water ejector 12. In a nozzle of the hot water ejector 12, the energy of the motive water is converted to kinetic energy. Thus, a portion of the hot motive water evaporates so that a mixture of water and vapor leaves the nozzle at high velocity. The vapor sucked in through suction line 11 is mixed in the mixing pipe of the hot water ejector 12 with the motive water thus producing an average mixture velocity. In the diffuser of the hot water ejector 12, the velocity of the mixture is decreased, accompanied by an increase in pressure. The mixture, which still consists of motive water and steam, then passes through a pipeline 14 into a tangential separator 15, where the water and steam are separated. All of the separated steam flows through pipeline 16 into the steam chamber 6 of the vertical tube evaporator 4 where it serves as the heating medium for the raw water entering into the vertical tube evaporator 4. The steam here transfers its latent heat to the raw water in the interior of the tube system 5, and thus is condensed.

A portion of the resulting distillate flows through a pipeline 20 to the ejector motive water pump 18. Another stream of water, i.e., the remaining water from the tangential separator 15, flows through pipeline 17 to the ejector motive water pump 18. The sum of these two streams of water again corresponds to the stream of water previously delivered into the hot water ejector 12. The ejector motive water pump 18 is arranged to handle the required pressure increase in the motive stream of water. From the pump 18, the stream of motive water passes through a heat exchanger 19 in which the entire heat supply is provided for the evaporation system. The heat exchanger 19 is positioned between the motive water pump 18 and the hot water ejector 12. The exchanger 19 is preferably designed as a tube-shell heat exchanger.

Depending on the degree of efficiency of the hot water ejector 12, a certain percentage of the stream of motive water must evaporate in the nozzle in order to produce the compression work required to condense the steam. Thus, a larger stream of steam flows through pipeline 16 than is sucked in through suction line 11 by the hot water ejector 12. The latent heat of this excess amount of steam, however, is required to heat the untreated water from the entry temperature to its boiling temperature when it enters through pipeline 3. Part of the hot steam condensate flows, as indicated above, through pipeline 20 to the ejector motive water pump 18. The remainder of this hot steam condensate flows, corresponding to the amount of steam sucked in through suction line 11, as distillate through pipeline 21 to the distillate trough $T_1$ of the first stage $S_1$ of the flash evaporator 1.

The distillate then flows through the flash evaporator 1 in parallel with the concentrated raw water entering through pipeline 10. Due to the evaporation process which is repeated stepwise from stage to stage, a further portion of the concentrated raw water evaporates so that an additional amount of distillate is produced. The entire resulting distillate, i.e. the distillate produced in the flash evaporator 1 as well as that produced in the vertical tube evaporator 4, is extracted from the last stage $S_5$ of the flash evaporator 1 with the aid of a pump 25. A portion of the higher concentrated brine from the chamber $L_5$ of this stage $S_5$ is also extracted with the aid of a pump 28 and a corresponding portion of fresh sea water is fed by means of a pump 26 into this stage $S_5$ for the purpose of obtaining the initial concentration in the recirculation system. The remaining portion of the raw water leaving the condenser $C_4$ is diverted.

The combination of a flash evaporator and a vapor compression evaporator, i.e., vertical tube evaporator 4, can be manufactured at much lower cost than a conventional flash evaporator when a hot water ejector is used and the same output as well as the same specific heat requirement is involved.

Figure 2:
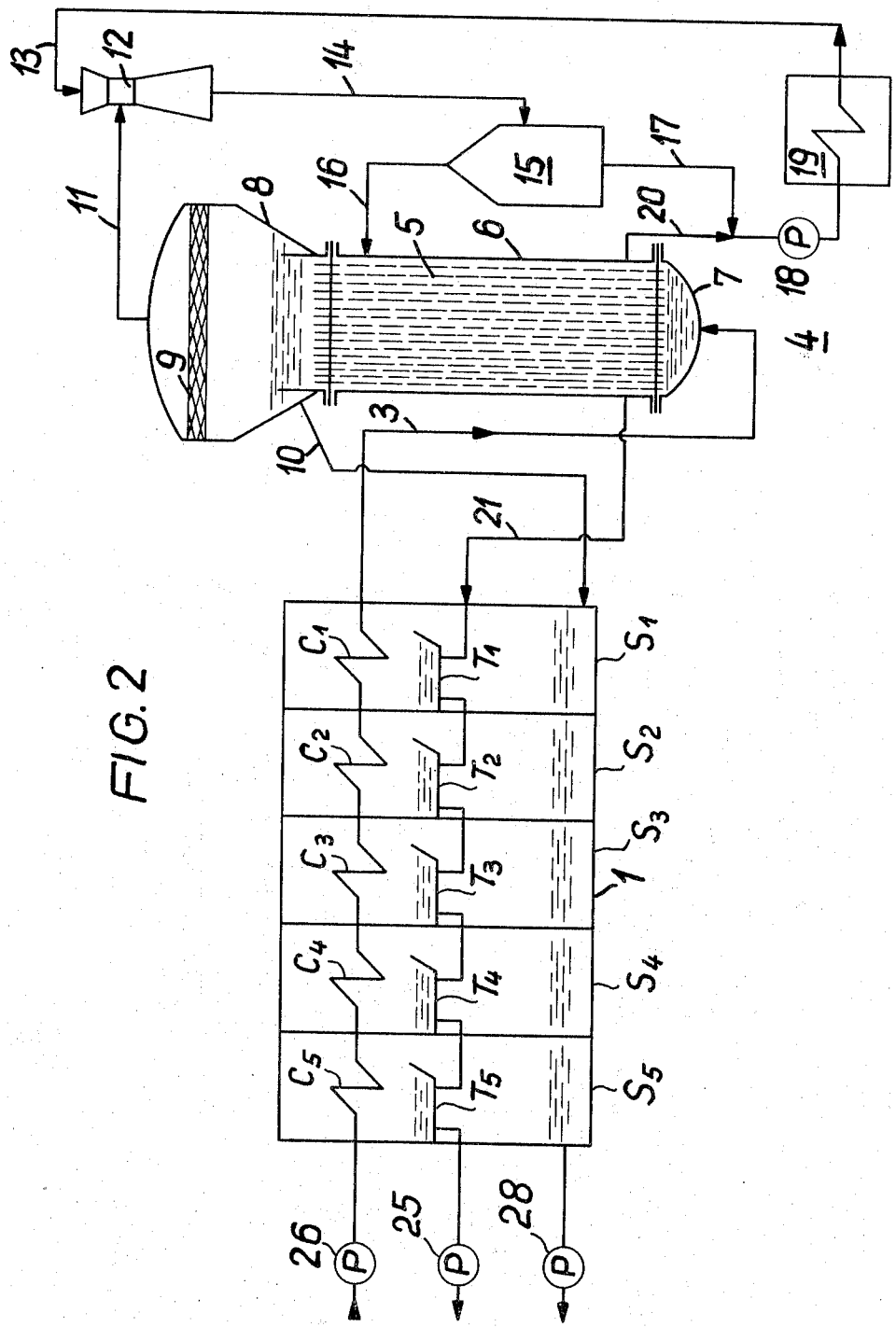
FIG. 2 is a schematic illustration of a second embodiment of the present multi-stage flash evaporation system which operates according to the once-through principle.

The optimum ratio of the distillate production in the flash evaporator system and in the vapor compression system can be easily determined by an optimization calculation. By increasing the distillate production in the vapor compression system the amount of raw water to be recirculated in the flash evaporator system is reduced. Finally, a point will be reached at which a flash evaporator system with brine recirculating no longer produces any substantial advantages. In such a case the flash evaporator system is preferably designed as a once-through system as schematically shown in FIG. 2. As shown in FIG. 2, the flash evaporator in the pass-through system consists only of a series of interconnected evaporation chambers $S_1$, $S_2$, $S_3$, etc., with the associated evaporation condensers $C_1$, $C_2$, $C_3$, etc. The evaporation chambers are not separated into a heat recovery section and a heat rejection section as in the brine recirculation system shown in FIG. 1. The pump 26 for the untreated water in this system pumps normal concentrated raw water through the series of connected condensers $C_5$, $C_4$, ...$C_2$ of the flash evaporator system 1 and then into the water entry chamber 7 of the vapor compression system 4. In the vapor compression system 4, a portion of the raw water evaporates so that the concentration of the remaining raw water is substantially increased. The unevaporated portion of untreated water then flows through pipeline 10 into the first flash chamber $S_1$ of the flash evaporator system 1. Because of the flash evaporation in this system, the concentration of the raw water increases from stage to stage, i.e., from stage $S_1$ to $S_2$ to $S_3$, etc., until finally in the last stage $S_5$ the maximum concentration has been attained.

With an increasing ratio of distillate production in the vapor compression system to distillate production in the flash evaporator system, the necessary heat transfer area of the vapor compression system to preheat the raw water to its boiling temperature will be increased too. With such increase in the preheating area it might be preferred to separate the entire heat transfer area of the vapor compression system into two apparatuses. one embodiment of such an arrangement is shown in FIG. 3, where the raw water which has been preheated in the flash evaporator system passes through pipeline 3 into a tube-shell heat exchanger 22 where it is heated to almost its boiling temperature in the vapor compression system. Then, the further heated raw water flows through an extension of pipeline 3 into the water entry chamber 7 of the vapor compression system 4 where a portion of this raw water is evaporated.

In a further variation of the embodiment shown in FIG. 3, the vapor compression system is composed of two or more evaporators 4. In this arrangement, the steam produced in the first evaporator 4, i.e., the steam of the evaporator operating at the highest temperature, is used to heat the next-following evaporator, and so forth. In other words, line 11 of the first evaporator is connected to line 16 of the next evaporator. Line 10 of each evaporator is connected to line 3 of the next succeeding evaporator. Lines 21 of all evaporators are connected in parallel. Any one or all evaporators can have a line 20. In the system according to this variation, only one set of elements 12, 15 and 19 is required. From the last evaporator, operating at the lowest temperature, the steam is extracted with the aid of the hot water ejector 12 and separator 15, is then compressed to the saturation pressure of the heating steam system of the first evaporator 4, and is delivered to chamber 6 thereof.

It is noted that the use of any one of the embodiments of the present flash evaporator process, described above and illustrated in the drawings, depends on the type of water to be treated and the rate of distillate production desired.

It will be understood that the above description of the present invention is susceptible to various modifications, changes and adaptations, and the same are intended to be comprehended within the meaning and range of equivalents of the appended claims.

I claim:

1. In a method for producing a distillate from raw water by the use of a multi-stage flash evaporator each stage of which includes an evaporation zone, a condensation zone and a distillate collection zone, the method including preheating raw water by passing it through the condensation zones of a plurality of the flash evaporator stages, partially evaporating the untreated water in the evaporation zones of the flash evaporator stages, condensing the evaporated water in the condensation zones of the flash evaporator stages, collecting the condensed water at the distillate collection zones of the flash evaporator stages, removing inert gases from the evaporation zones, and adding additional heat energy to the evaporation system, the improvement comprising:

conveying the preheated raw water from the last of the condensation zones through which it passes to a vertical tube evaporator;

passing such water through the vertical tube evaporator;

evaporating a portion of the water passing through the vertical tube evaporator by bringing it into heat-exchange communication with a heating medium;

removing the resulting vapor from the vertical tube evaporator;

compressing the removed vapor to a higher saturation temperature by means of a heat pump comprising a hot water ejector which receives said removed vapor and an ejector motive water pump connected to said hot water ejector for supplying hot water to said hot water ejector and returning the vapor to the vertical tube evaporator as the heating medium, the transfer of heat from such heating medium to the water passing through the vertical tube evaporator causing the vapor constituting the heating medium to condense;

conveying a first portion of the condensed heating medium, as a distillate, from the vertical tube evaporator to the flash evaporator distillate collection zones to transfer part of the heat contained in the condensed medium, by stepwise evaporation, to the raw water passing through the condensation zones;

conveying a second portion of the condensed heating medium to the ejector motive water pump;

conveying the portion of the water which passed through the vertical tube evaporator without evaporation through the evaporation zones of the flash evaporator stages in succession for causing such water to partially evaporate in a stepwise manner in the stages, to transfer heat to the raw water passing through the flash evaporator zones, and to condense as a result of such heat transfer; and collecting the distillate from the respective distillate collection zones of the flash evaporation zone and from the vertical tube evaporator, and having the distillate production in the flash evaporator higher than the distillate production in the vertical tube evaporator.

2. The method as defined in claim 1 wherein a mixture of motive water and steam emerges from the hot water ejector, this mixture is conveyed to a separator to separate the water and steam, and the separated steam is conveyed into the vertical tube evaporator as the heating medium.

3. The method as defined in claim 1 wherein the hot water leaving the ejector motive water pump is heated by a heat exchanger before it enters the hot water ejector.

4. The method as defined in claim 3, wherein the preheated raw water leaving the last of the condensation zones of the multi-stage flash evaporator is heated by a heat exchanger before it enters the vertical tube evaporator.

5. The method as defined in claim 1 wherein the preheated raw water leaving the last of the condensation zones of the multi-stage flash evaporator is passed through a plurality of vertical tube evaporators.

6. Apparatus for distilling raw water, comprising in combination:

- a flash evaporator having a plurality of flash stages each constituted by an upper chamber defining a condensation zone, a lower chamber defining an evaporation zone, and a distillate collection trough positioned at the bottom of said condensation zone, said troughs in said stages being connected together;
- first conduit means for conveying untreated water through said condensation zones of a plurality of said stages for preheating such water;
- a vertical tube evaporator connected to said first conduit means for receiving the preheated raw water therefrom, said vertical tube evaporator including an evaporation zone and a vapor condensation zone separated from said evaporation zone and in heat-exchange communication therewith, said first conduit means being in liquid flow communication with said evaporation zone;
- heat pump means connected to said vertical tube evaporator to receive the vapor produced in said evaporation zone thereof for compressing such vapor to a higher saturation temperature, the outlet of said heat pump means being connected to said vapor condensation zone of said vertical tube evaporator for supplying heated vapor thereto, said heat pump means comprising a hot water ejector which receives the vapor produced in the evaporation zone of the vertical tube evaporator and an ejector motive water pump connected to the hot water ejector for supplying hot motive to the hot water ejector, said ejector motive water pump also being connected to the vapor condensation zone of the vertical tube evaporator for receiving hot water therefrom;
- second conduit means connected between said evaporation zone of said vertical tube evaporator and said lower chamber of one of said flash evaporator stages for conveying water which has passed through said evaporation zone of said vertical tube evaporator without evaporating; and
- third conduit means connected between said vapor condensation zone and said collection trough of one of said flash evaporation stages for conveying vapor condensate formed in said vapor condensation zone of said vertical tube evaporator, said apparatus being constructed to have the distillate production in the flash evaporator higher than the distillate production in the vertical tube evaporator.

7. An apparatus as defined in claim 6, wherein said first conduit means comprises a recirculation pump having its input connected to the last stage of said flash evaporator.

8. An apparatus as defined in claim 6 further comprising a heat exchanger connected between the outlet of said ejector motive water pump and the hot water input of said ejector.

9. An apparatus as defined in claim 8, further comprising a second heat exchanger connected in said first conduit means between said flash evaporator and the inlet of said evaporation zone of said vertical tube evaporator.

10. An apparatus as defined in claim 6 including a plurality of vertical tube evaporators connected together in series.

* * * * *